(12) United States Patent  
Shah

(10) Patent No.: US 10,858,270 B2  
(45) Date of Patent: Dec. 8, 2020

(54) PROCESS AND SYSTEM FOR SUBCRITICAL OXIDATION OF WATER-BORNE ORGANIC CONTAMINANTS

(71) Applicant: Arkema Inc., King of Prussia, PA (US)

(72) Inventor: Shashank N. Shah, Allentown, PA (US)

(73) Assignee: Arkema Inc., King of Prussia, PA (US)

( * ) Notice: Subject to any disclaimer, the term of this patent is extended or adjusted under 35 U.S.C. 154(b) by 232 days.

(21) Appl. No.: 16/091,533

(22) PCT Filed: Apr. 4, 2017

(86) PCT No.: PCT/US2017/025820  
§ 371 (c)(1),  
(2) Date: Oct. 5, 2018

(87) PCT Pub. No.: WO2017/176659  
PCT Pub. Date: Oct. 12, 2017

(65) Prior Publication Data  
US 2019/0127248 A1    May 2, 2019

Related U.S. Application Data

(60) Provisional application No. 62/319,864, filed on Apr. 8, 2016.

(51) Int. Cl.  
*C02F 1/72* (2006.01)  
*C02F 11/08* (2006.01)  
*C02F 1/02* (2006.01)  
*C02F 1/20* (2006.01)  
*C02F 1/28* (2006.01)  
(Continued)

(52) U.S. Cl.  
CPC ............. *C02F 1/722* (2013.01); *C02F 1/02* (2013.01); *C02F 1/725* (2013.01); *C02F 1/727* (2013.01); *C02F 11/08* (2013.01); *C02F 1/20* (2013.01); *C02F 1/283* (2013.01); *C02F 1/42* (2013.01); *C02F 1/441* (2013.01); *C02F 1/66* (2013.01); *C02F 2101/32* (2013.01); *C02F 2101/327* (2013.01); *C02F 2101/345* (2013.01); *C02F 2101/36* (2013.01); *C02F 2103/10* (2013.01); *C02F 2103/36* (2013.01); *C02F 2103/365* (2013.01); *C02F 2201/002* (2013.01); *C02F 2209/02* (2013.01); *C02F 2209/03* (2013.01)

(58) Field of Classification Search  
CPC .... C02F 1/20; C02F 1/283; C02F 1/42; C02F 1/66; C02F 1/722; C02F 1/725; C02F 1/727; C02F 11/06; C02F 11/08; C02F 11/083; C02F 11/086; C02F 2101/32; C02F 2101/327; C02F 2101/345; C02F 2101/36; C02F 2103/10; C02F 2103/36; C02F 2103/365; C02F 2201/002; C02F 2209/02; C02F 2209/03; C02F 1/02  
See application file for complete search history.

(56) References Cited

U.S. PATENT DOCUMENTS 3,642,620 A    2/1972 Cole et al.  
4,053,404 A * 10/1977 Van Kirk ................ C02F 11/08  
210/761

(Continued)

*Primary Examiner* — Lucas A Stelling  
(74) *Attorney, Agent, or Firm* — Steven D. Boyd

(57) ABSTRACT

A highly efficient and effective process for destroying organic contaminants in wastewater streams, without the need for supercritical oxidation conditions, is provided.

13 Claims, 1 Drawing Sheet

(51) Int. Cl.

| | |
|---|---|
| C02F 1/42 | (2006.01) |
| C02F 1/44 | (2006.01) |
| C02F 1/66 | (2006.01) |
| C02F 101/32 | (2006.01) |
| C02F 101/34 | (2006.01) |
| C02F 103/10 | (2006.01) |
| C02F 103/36 | (2006.01) |
| C02F 101/36 | (2006.01) |

(56) References Cited

U.S. PATENT DOCUMENTS

| | | | |
|---|---|---|---|
| 4,234,426 A * | 11/1980 | Wilhelmi | C02F 11/08 210/149 |
| 5,635,078 A | 6/1997 | Yan | |
| 2005/0006317 A1 | 1/2005 | Lee et al. | |
| 2007/0210010 A1* | 9/2007 | Miyake | C02F 1/725 210/762 |
| 2011/0079560 A1 | 4/2011 | Maugans et al. | |
| 2012/0055872 A1 | 3/2012 | Gattrell | |
| 2012/0067825 A1* | 3/2012 | Pique | E21F 3/00 210/723 |
| 2012/0205320 A1 | 8/2012 | Lean et al. | |
| 2013/0193087 A1 | 8/2013 | Moriya et al. | |

\* cited by examiner

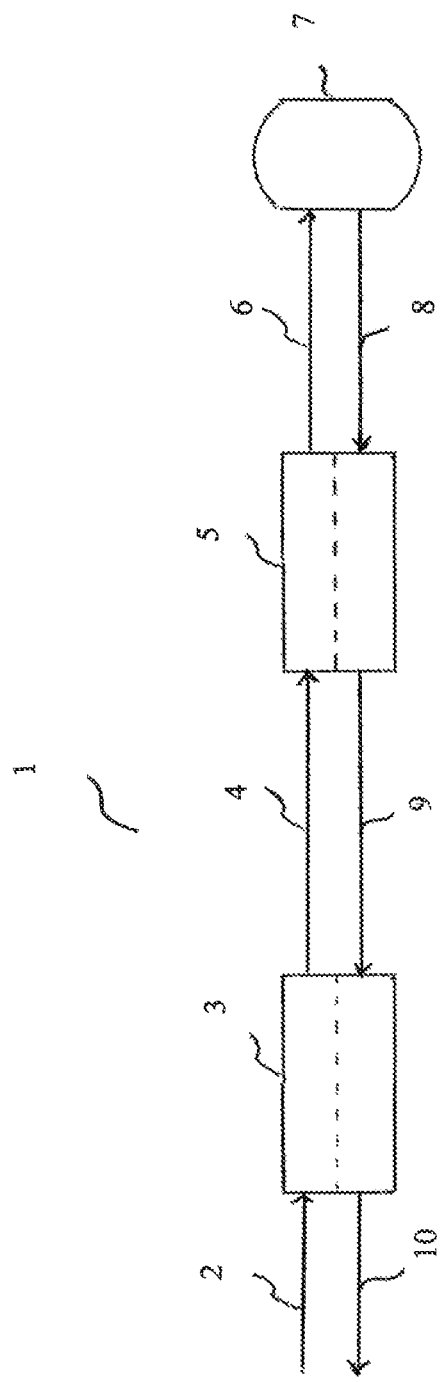

PROCESS AND SYSTEM FOR SUBCRITICAL OXIDATION OF WATER-BORNE ORGANIC CONTAMINANTS

This present application is the national phase under 35 USC § 371 of prior PCT International Application Number PCT/US2017/025820 filed Apr. 4, 2017 which designated the United States of America and claimed priority to U.S. Provisional Patent Application Ser. No. 62/319,864 filed Apr. 8, 2016.

FIELD OF THE INVENTION

The present invention relates to systems and processes useful for carrying out the destruction of organic contaminants in waste water streams in an efficient manner.

DISCUSSION OF THE RELATED ART

Wet oxidation is a known technology for the destruction of organic contaminants in wastewater. Such processes involve treatment of the wastewater with an oxidant, generally molecular oxygen from an oxygen-containing gas, at elevated temperatures and pressures. The oxidation may be carried out at subcritical or supercritical conditions. The critical point of water is 374° C. and 218 atm pressure. It has generally been recognized that accomplishing essentially complete destruction of organic contaminants in an aqueous waste stream under subcritical conditions is quite challenging. For example, U.S. Pat. No. 5,240,619 states that "Complete removal of all pollutants from wastewater by wet oxidation at subcritical conditions generally cannot be achieved." For this reason, considerable attention has been devoted to the development of treatment processes involving at least one step which is performed at supercritical conditions. While such processes can be effective, with respect to conversion of essentially all organic components of waste streams to relatively benign substances such as carbon dioxide, a system capable of withstanding supercritical temperatures and pressure requires relatively costly equipment having the necessary high temperature- and pressure-resistant materials of construction. Moreover, the operational costs of such systems can be significant due to the amount of energy required to bring a wastewater stream from ambient conditions to the supercritical state needed to assure complete destruction of the organic contaminants.

Accordingly, the development of processes and systems capable of treating wastewater containing organic contaminants in a highly effective, yet energy efficient, manner under entirely subcritical conditions would be of great interest.

SUMMARY OF THE INVENTION

It has now been discovered that the goal of complete or near complete destruction of non-biodegradable organic compounds in wastewater streams, which normally is achievable only through the use of SCWO (Supercritical Water Oxidation) processes, may be attained economically by using a peroxide oxidizing agent (such as hydrogen peroxide), a combination of heat and mechanical energy integration, and subcritical conditions that permit the use of less expensive materials of construction than are required for a SCWO process.

Various non-limiting, illustrative aspects of the invention may be summarized as follows.

Aspect 1: A process for treating a waste stream comprised of water, at least one organic contaminant and, optionally, at least one oxidizing agent, wherein the process comprises:
a) passing the waste stream, having an initial temperature and an initial pressure, through a pressure exchanger and a heat exchanger to obtain a heated, pressurized stream having a temperature higher than the initial temperature and a pressure higher than the initial pressure;
b) introducing the heated, pressurized stream and, if the heated, pressurized stream does not already contain an oxidizing agent, at least one oxidizing agent into a reactor vessel and oxidizing the at least one organic contaminant;
c) withdrawing a first treated stream from the reactor vessel, wherein the treated stream has a lower concentration of at least one organic contaminant as compared to the waste stream; and
d) passing the first treated stream, having a post-oxidation temperature and a post-oxidation pressure, through the heat exchanger and the pressure exchanger to obtain a second treated stream having a temperature lower than the post-oxidation temperature of the first treated stream, as a result of heat exchange between the waste stream and the first treated stream, and a pressure lower than the post-oxidation pressure of the first treated stream, as a result of pressure exchange between the waste stream and the first treated stream;
wherein the process is carried out in its entirety under subcritical conditions, the heat exchanger recovers at least 80% of heat input, and the pressure exchanger recovers at least 95% of mechanical energy.

Aspect 2: The process of Aspect 1, wherein the waste stream comprises at least one oxidizing agent.

Aspect 3: The process of Aspect 2, wherein the at least one oxidizing agent includes at least one peroxide.

Aspect 4: The process of Aspect 2, wherein the at least one oxidizing agent includes hydrogen peroxide.

Aspect 5: The process of any one of Aspects 1-4, wherein at least one oxidizing agent is introduced into the reactor vessel and the at least one oxidizing agent includes at least one of molecular oxygen or at least one peroxide.

Aspect 6: The process of any one of Aspects 1-5, wherein at least one catalyst capable of catalyzing oxidation of the at least one organic contaminant is present in the reactor vessel and is contacted with the heated, pressurized stream.

Aspect 7: The process of any one of Aspects 1-6, wherein the heat exchanger recovers up to 95% of heat input.

Aspect 8: The process of any one of Aspects 1-7, wherein the pressure exchanger recovers up to 98% of mechanical input.

Aspect 9: The process of any one of Aspects 1-8, wherein the process is operated under subcritical conditions approaching subcritical conditions which are effective to achieve destruction of at least 90% by weight of the total amount of organic contaminants present in the waste stream.

Aspect 10: The process of any one of Aspects 1-9, wherein the pressure exchanger is a rotary pressure exchanger.

Aspect 11: The process of any one of Aspects 1-10, wherein the heat exchanger is a plate heat exchanger or a shell and tube heat exchanger.

Aspect 12: The process of any one of Aspects 1-11, wherein the reaction vessel is maintained at a temperature of from 200 to 350° C. and a pressure of from 500 to 3000 psig.

Aspect 13: The process of any one of Aspects 1-12, wherein the process does not utilize any motorized equipment.

Aspect 14: A system for purifying a waste stream comprised of water, at least one organic contaminant and, optionally, at least one oxidizing agent comprising:

i) a feed line for the waste stream;
ii) a reactor vessel;
iii) a heat exchanger; and
iv) a pressure exchanger;

wherein:
a) the waste stream is provided to the reactor vessel by the feed line;
b) the waste stream, when in the reactor vessel, is in a subcritical state;
c) in the reactor vessel the at least one organic contaminant undergoes a catalyzed or uncatalyzed oxidative reaction with oxidizing agent effective to completely oxidize at least a portion of the organic contaminant, forming a purified effluent stream;
d) the heat exchanger removes heat from the purified effluent stream for use in raising the temperature of the waste stream and recovers at least 80% of heat input; and
e) the pressure exchanger removes mechanical energy from the effluent stream for use in raising the pressure of the waste stream and recovers at least 95% of such mechanical energy.

Aspect 15: The system of Aspect 14, wherein the waste stream comprises at least one oxidizing agent.

Aspect 16: The system of Aspect 15, wherein the at least one oxidizing agent includes at least one peroxide.

Aspect 17: The system of Aspect 15, wherein the at least one oxidizing agent includes hydrogen peroxide.

Aspect 18: The system of Aspect 15, wherein at least one oxidizing agent is introduced into the reactor vessel and the at least one oxidizing agent includes at least one of molecular oxygen or at least one peroxide.

Aspect 19: The system of any one of Aspects 14-18, wherein at least one catalyst capable of catalyzing oxidation of the at least one organic contaminant is present in the reactor vessel and is contacted with the waste stream.

Aspect 20: The system of any one of Aspects 14-19, wherein the heat exchanger recovers at least 95% of heat input.

Aspect 21: The system of any one of Aspects 14-20, wherein the pressure exchanger recovers at least 98% of mechanical energy.

Aspect 22: The system of any one of Aspects 14-21, wherein the pressure exchanger is a rotary pressure exchanger.

Aspect 23: The system of any one of Aspects 14-22, wherein the heat exchanger is a plate heat exchanger, tube-in-tube heat exchanger, or a shell and tube heat exchanger.

Aspect 24: The system of any one of Aspects 14-23, wherein the reaction vessel is maintained at a temperature of from 200 to 350° C. and a pressure of from 500 to 3000 psig.

Aspect 25: The system of any one of Aspects 14-24, wherein the system does not include any motorized equipment.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

DESCRIPTION OF THE DRAWING

FIG. 1 shows, in schematic form, a flow chart illustrating an embodiment of the process and system of the present invention.

DETAILED DESCRIPTION OF CERTAIN EMBODIMENTS OF THE INVENTION

The processes and systems of the present invention are useful in the destruction, i.e., partial to complete oxidation, of organic compounds present as contaminants in aqueous streams, even at relatively high concentrations (e.g., up to 3000 mg/L or even more). Additionally, the present invention provides a safer and more economic approach to effective destruction of such contaminants over other conventional approaches.

In one aspect, the invention is directed to a process for oxidizing organic contaminants in waste streams comprised of water using sub-critical temperature and pressure. The wastewater stream contains dissolved, suspended and/or dispersed contaminants which are oxidizable under subcritical conditions. Wastewater streams suitable for processing in accordance with the present invention may include, for example, industrial wastewater streams such as those produced by oil and gas industries, chemical industries and mining industries. Other sources of suitable wastewater streams include agriculture wastewater, sewage waste and dredging sludge. The waste stream to be treated by means of the present invention may be treated is "as is" form (i.e., without being modified from its original state) or may, prior to being subjected to processing in accordance with the present invention, be subjected to one or more pretreatment steps such as filtration, concentration (by removal of water, for example), dilution (by addition of water, for example) or treatment or combination with one or more additional components (such as an oxidizing agent, in particular a peroxide such as hydrogen peroxide).

Any type of organic compound may be effectively destroyed using the process and system of the present invention, including, for example, aromatic hydrocarbons (e.g., toluene, ethylbenzene, xylenes, n-propylbenzene, trimethylbenzenes, isopropyltoluene, naphthalene), halocarbons (e.g., dichloromethane, chloroform), phenolic compounds (cresols, dimethylphenol), ketones, alcohols, aliphatic hydrocarbons, esters and the like and combinations thereof. The concentration of organic compounds in the waste stream to be treated is not believed to be critical and may range, for example, from 50 ppm to 2000 ppm.

In certain embodiments, the waste stream already contains one or more oxidizing agents, such as hydrogen peroxide. An additional amount of oxidizing agent may be added to such a waste stream, to supplement the amount of oxidizing agent already present. The added oxidizing agent(s) may be the same as or different from the oxidizing agent(s) already present in the waste stream. In other embodiments of the invention, the waste stream as originally obtained from the waste source does not contain any oxidizing agent and one or more oxidizing agents are combined with the waste stream. If oxidizing agent is added to the waste stream, such addition may take place at any point prior to the waste stream being introduced into the reactor vessel where oxidation of the organic contaminant(s) in the waste stream is carried out. For example, oxidizing agent may be introduced before the waste stream passes into the pressure exchanger, and/or after the waste stream passes out of the pressure exchanger and into the heat exchanger, and/or after the waste stream passes out of the heat exchanger and into the reactor vessel. In other embodiments, oxidizing agent is introduced directly into the reactor vessel without first being combined with the waste stream.

Suitable oxidizing agents include any substance capable of serving as a source of oxygen during oxidation of the organic contaminants. For example, molecular oxygen ($O_2$) may be used. In other embodiments, one or more peroxide compounds may be used, such as hydroperoxides. In an particularly desirable embodiment, hydrogen peroxide is employed as an oxidizing agent, as the predominant oxidizing agent (e.g., at least 50%, at least 60%, at least 70%, at least 80%, at least 90% or at least 95% by weight of the oxidizing agent used in the process is hydrogen peroxide), or even as the sole oxidizing agent. Hydrogen peroxide may, in various embodiments, be used in combination with molecular oxygen. The concentration of hydrogen peroxide present in or combined with the waste stream to be treated in accordance with the subcritical oxidation process of the present invention may be, for example, from about 100 to about 10,000 mg/L or about 500 to about 8000 mg/L, in various exemplary embodiments.

The waste stream is contacted with an oxidizing agent such as hydrogen peroxide and subjected to subcritical temperature and pressure effective to completely oxidize all or part of the organic contaminant(s) present in the waste stream. For example, the subcritical temperature may be between ambient temperature (e.g., 25° C.) and a temperature less than 374.1° C., or between 50° C. and 370° C., or between 100° C. and 350° C., or between 200° C. and 350° C. The subcritical pressure may be between atmospheric pressure (1 atmosphere) and a pressure less than 3208 psi, or between 200 psi and 3100 psi or between 500 psi and 3000 psi.

The oxidation step of the inventive process may be carried out in a reactor vessel (including a series of reactor vessels or a tubular reactor) of any suitable configuration which is capable of withstanding the desired subcritical oxidation conditions. One particular advantage of the present invention is that, due to the use of subcritical conditions to achieve destruction of the organic contaminants, costly reactor equipment which is able to endure supercritical conditions need not be utilized. In embodiments where a peroxide oxidizing agent (e.g., hydrogen peroxide) is used, the reactor vessel and/or a feed line into the reactor vessel containing peroxide oxidizing agent may be equipped with one or more UV light sources. Irradiation of the peroxide oxidizing agent with UV light may help to promote dissociation of the peroxide oxidizing agent, leading to the production of oxygen-containing radicals (such as hydroxyl radicals) which then react with and oxidize the organic contaminants or which otherwise promote the oxidation of the organic contaminants.

In certain embodiments, the organic compounds present in the waste stream may begin to oxidize prior to the waste stream entering the reactor vessel. In other embodiments, oxidation of the organic compounds may continue or be completed even after the treated waste stream exits from the reactor. Thus, oxidation of the organic compounds need not take place entirely within the reactor vessel. However, the reactor vessel provides the residence time where the bulk of the subcritical oxidation of the organic compounds takes place.

The heated, pressurized waste stream is introduced into a reactor vessel where it is retained under elevated (but subcritical) temperature and pressure for a sufficient time to the desired oxidation reactions of the organic compounds in the waste stream to take place. The oxidation reaction is generally exothermic and a heat exchanger (preferably, a high efficiency heat exchanger) is used to remove heat from the oxidized reactor vessel effluent and preheat the influent waste stream being introduced into the reactor vessel, as described elsewhere herein in more detail.

One or more catalysts may be contained in the reactor vessel which are capable of accelerating the rate at which the organic compound contaminants present in the waste stream are oxidized and thereby destroyed. Any of the oxidation catalysts known in the art may be employed, including, without limitation, oxide catalysts such as silica and silicate catalysts (e.g., silica, zeolites) and metal-containing catalysts (wherein the metal is a transition metal or Fe, Cu, Pd or the like, for example). In embodiments of the invention, the catalyst or catalysts is or are insoluble in the waste stream. The catalyst may be a supported or heterogeneous catalyst. The catalyst(s) may be contained within the reactor vessel in the form of a fixed bed, for example.

FIG. 1 provides an embodiment of a block diagram showing the general arrangement of an illustrative system (1) which can be used to purify water contaminated with organic compounds in accordance with the present invention by the use of a subcritical oxidation process. A waste stream to be purified is input into the system through feed (2). At this stage, one or more oxidizing agents may also be introduced into the system, if so desired (in particular, where the waste stream does not already contain any oxidizing agent or an insufficient concentration of oxidizing agent relative to the amount of organic contaminants to be oxidized). However, oxidizing agent may also or alternatively be introduced at a later point in the system so that it is present in the reactor vessel when oxidation of the organic compounds is being carried out. Such introduction may be accomplished by any suitable or known method (not shown). The waste stream at this stage is at a relatively low temperature and pressure. The waste stream is passed through a pressure exchanger (3) and a heat exchanger (5) before being introduced into reactor vessel (7). The effluent stream exiting reactor vessel (7) via feed (8) is also passed through heat exchanger (5) and pressure exchanger (3). These exchangers (3) and (5) may utilize any method(s) or means known in the art to exchange heat and pressure from the effluent stream to the waste stream to assist in raising its pressure and temperature to the degree needed to effect the desired extent of destruction of the organic compounds present in the waste stream during oxidation in reactor vessel (7), provided that such exchangers are capable of operating at a sufficiently high level of efficiency. In this way, the heat and pressure of the effluent stream from the reactor vessel are substantially recycled back into the initial waste stream, which helps to make the system run more efficiently and requires that little or no additional energy in the form of heat or mechanical energy be provided into the system once the inventive process has been started up and is running under steady state conditions. Thus, in various embodiments of the invention, the net energy input is not more than 15%, not more than 10%, not more than 9%, not more than 8%, not more than 7%, not more than 6%, not more than 5%, not more than 4% or even less of the energy input that would otherwise be required to bring a wastewater stream from ambient temperature and pressure to the high (but subcritical) temperature and pressure effective to achieve complete or near complete destruction of the organic compounds present in the wastewater stream, which would be prohibitively expensive for the large flow rates at which wastewater purification processes typically need to be run (e.g., 50 to 100 gallons per minute).

A single heat exchanger and/or a single pressure exchanger may be employed in various embodiments of the invention. In other embodiments, a plurality of heat exchangers and/or a plurality of pressure exchangers may be utilized. In embodiments where a plurality of exchangers are present in the system, they may be arranged in series or in parallel.

In particular, the heat exchanger (or plurality of heat exchangers) is selected and operated such that when the process/system of the present invention is operating at steady state a recovery of heat input of at least 80%, at least 85%, at least 90%, at least 91%, at least 92%, at least 93%, at least 95%, at least 96%, at least 97%, at least 98%, or even greater is achieved, recognizing that 100% recovery of heat input is not possible. Suitable types of high efficiency heat exchangers useful in the present invention include, for example, plate heat exchangers, tube-in-tube heat exchangers, and shell and tube heat exchangers. As is well known in the art, calculation of the % recovery of heat input may be performed by measuring the flows on each side of the heat exchanger and the temperatures of the incoming and outgoing streams to perform an energy balance around the equipment.

With respect to the pressure exchanger(s) employed, such pressure exchanger (or plurality of pressure exchangers) is selected and operated such that when the process/system of the present invention is operating at steady state a recovery of mechanical energy of at least 95%, at least 96%, at least 97%, at least 98% or even greater is achieved, recognizing that 100% recovery of mechanical energy is not possible. Suitable types of high efficiency pressure exchangers useful in the present invention include, for example, rotary pressure exchangers, such as those sold by Energy Recovery Inc. as well as those described in U.S. Pat. Nos. 4,887,942; 5,338,158; 5,988,993; and 6,540,487, each of which is incorporated herein by reference in its entirety for all purposes. The % recovery of mechanical energy may be done by following the standard practice of measuring flows on either side of the pressure exchanger and the pressures of both the incoming and outgoing streams to perform a mechanical energy balance.

In certain embodiments of the invention, the process may be operated without the use of any motorized equipment such as pumps, centrifuges or the like. However, it is understood that during start-up of the process, it may be necessary to use certain motorized equipment such as pumps until such time as the process reaches a steady state of operation.

As the waste stream exits pressure exchanger (3) via feed (4), it has a pressure which is increased relative to the pressure of the waste stream entering the pressure exchanger through feed (2). For example, the pressure may be increased from approximately 1 atmosphere to 500 psi, 1000 psi, 1500 psi, 2000 psi, 2500 psi, 3000 psi or even higher, provided that supercritical conditions are avoided. The temperature of the waste stream generally is not increased significantly as it passes through pressure exchanger (3) because typically there is not much surface area within the pressure exchanger to allow heat exchange. However, the waste stream temperature is increased as a resulting of passing through heat exchanger (5), such that the temperature of the waste stream exiting heat exchanger (5) through feed (6) is significantly higher than the temperature of the pressurized waste stream in feed (4). For example, the waste stream temperature may be increased from ambient temperature (e.g., 25-50° C.) to a temperature effective to achieve the desired extent of conversion of the organic compounds in the waste stream within reactor vessel (7), which could be at least 100° C., at least 150° C., at least 200° C., at least 250° C., at least 300° C., at least 325° C., or even higher, provided that supercritical conditions are avoided.

As previously mentioned, the heated, pressurized waste stream is introduced into reactor vessel (7) by means of feed (6), wherein it undergoes oxidative destruction of the organic compounds contained in the waste stream. The treated waste stream, containing a reduced concentration of organic compounds as compared to the initial untreated waste stream, exits reactor vessel (7) through feed (8). The treated waste stream may also contain oxidation by-products, in particular carbon dioxide, derived from the oxidized organic compounds. At this point, the treated waste stream has a temperature and pressure which are elevated above ambient temperature and atmospheric pressure; typically, the temperature and pressure of the treated waste stream exiting reactor vessel (7) are generally similar to, or somewhat elevated as compared to, the temperature and pressure of the waste stream entering reactor vessel (7). The treated waste stream is fed to heat exchanger (5) through feed (8), wherein at least a portion of the heat contained in the treated waste stream is removed and transferred in a highly efficient manner to the untreated waste stream, as previously described. The heat exchange taking place in heat exchanger (5) results in a significant lowering of the temperature of the treated waste stream. For example, the treated waste stream temperature may drop from about 280° C. to about 40° C. However, the treated waste stream exiting heat exchanger (5) via feed (9) is generally still at a pressure which is higher than atmospheric pressure (e.g., about 100 to about 3000 psi).

Pressure exchanger (3) is utilized to reduce the pressure of the treated waste stream introduced to pressure exchanger (3) by means of feed (9). As described elsewhere herein, pressure exchanger (3) is capable of operating at high efficiency, extracting at least 90% or at least 95% or even more of the mechanical energy of the waste stream and utilizing this recovered mechanical energy to increase the pressure of the untreated waste stream entering pressure exchanger (3) through feed (2). The pressure of the treated waste stream, withdrawn from pressure exchanger (3) using feed (10), is thereby lowered, typically to a significant extent (e.g., from about 900 psi to about 25 psi).

In various embodiments of the invention, the processing conditions are selected and controlled so as to achieve the desired rate of destruction of the organic compound(s) which contaminate the waste stream. Depending upon the types of organic contaminants present in the waste stream and their initial concentrations as well as the intended use or disposition of the treated waste stream, it may not be necessary to achieve an extremely high destruction efficiency (percent reduction in the concentration of organic contaminant(s)). For example, the destruction efficiency may be at least at least 90%, at least 95%, at least 99%, at least 99.95%, at least 99.99% or even 100%.

The above-described process may, in certain embodiments, be performed in a continuous manner.

The treated water obtained by operation of the process and system of the present invention, as described hereinabove, may be sufficiently pure that it is suitable for a variety of uses that the initial waste stream is not, due to its content of organic compound contaminants. For example, the treated water may be low enough in organic compound content that it can be utilized as potable water, a source of purified water for cooling, washing or other industrial operations or in sewage treatment or latrine systems, or discharged directly into natural waterways and bodies of water.

However, the treated water may also, in various embodiments of the invention, be subjected to one or more further processing steps so as to purify it even further. Such further processing steps include, but are not limited to, filtration, treatment with an adsorbent such as activated carbon, desalting, degassing, distillation, membrane treatment, osmosis, ion exchange resin treatment, neutralization or the like or combinations thereof.

Within this specification embodiments have been described in a way which enables a clear and concise specification to be written, but it is intended and will be appreciated that embodiments may be variously combined or separated without departing from the invention. For example, it will be appreciated that all preferred features described herein are applicable to all aspects of the invention described herein.

In some embodiments, the invention herein can be construed as excluding any element or process step that does not materially affect the basic and novel characteristics of the composition or process. Additionally, in some embodiments, the invention can be construed as excluding any element or process step not specified herein.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A process for treating a waste stream comprised of water, at least one organic contaminant and, optionally, at least one oxidizing agent, wherein the process comprises:
   a) passing the waste stream, having an initial temperature and an initial pressure, through a pressure exchanger and a heat exchanger to obtain a heated, pressurized stream having a temperature higher than the initial temperature and a pressure higher than the initial pressure;
   b) introducing the heated, pressurized stream and, if the heated, pressurized stream does not already contain an oxidizing agent, at least one oxidizing agent into a reactor vessel and oxidizing the at least one organic contaminant;
   c) withdrawing a first treated stream from the reactor vessel, wherein the treated stream has a lower concentration of at least one organic contaminant as compared to the waste stream; and
   d) passing the first treated stream, having a post-oxidation temperature and a post-oxidation pressure, through the heat exchanger and the pressure exchanger to obtain a second treated stream having a temperature lower than the post-oxidation temperature of the first treated stream, as a result of heat exchange between the waste stream and the first treated stream, and a pressure lower than the post-oxidation pressure of the first treated stream, as a result of pressure exchange between the waste stream and the first treated stream;
   wherein the process is carried out in its entirety under subcritical conditions, the heat exchanger recovers at least 80% of heat input, and the pressure exchanger recovers at least 95% of mechanical energy.

2. The process of claim 1, wherein the waste stream comprises at least one oxidizing agent.

3. The process of claim 2, wherein the at least one oxidizing agent includes at least one peroxide.

4. The process of claim 2, wherein the at least one oxidizing agent includes hydrogen peroxide.

5. The process of claim 1, wherein at least one oxidizing agent is introduced into the reactor vessel and the at least one oxidizing agent includes at least one of molecular oxygen or at least one peroxide.

6. The process of claim 1, wherein at least one catalyst capable of catalyzing oxidation of the at least one organic contaminant is present in the reactor vessel and is contacted with the heated, pressurized stream.

7. The process of claim 1, wherein the heat exchanger recovers up to 95% of heat input.

8. The process of claim 1, wherein the pressure exchanger recovers up to 98% of mechanical input.

9. The process of claim 1, wherein the process is operated under subcritical conditions approaching subcritical conditions which are effective to achieve destruction of at least 90% by weight of the total amount of organic contaminants present in the waste stream.

10. The process of claim 1, wherein the pressure exchanger is a rotary pressure exchanger.

11. The process of claim 1, wherein the heat exchanger is a plate heat exchanger, a tube-in-tube heat exchanger or a shell and tube heat exchanger.

12. The process of claim 1, wherein the reaction vessel is maintained at a temperature of from 200 to 350° C. and a pressure of from 500 to 3000 psig.

13. The process of claim 1, wherein the process does not utilize any motorized equipment.

* * * * *